United States Patent [19]

Rado

[11] Patent Number: 5,893,349
[45] Date of Patent: Apr. 13, 1999

[54] METHOD AND SYSTEM FOR CONTROLLING AIR/FUEL RATIO OF AN INTERNAL COMBUSTION ENGINE DURING COLD START

[75] Inventor: William George Rado, Ann Arbor, Mich.

[73] Assignee: Ford Global Technologies, Inc., Dearborn, Mich.

[21] Appl. No.: 09/027,816

[22] Filed: Feb. 23, 1998

[51] Int. Cl.$^6$ ..................................................... F02P 5/153
[52] U.S. Cl. .......................... 123/406.42; 123/406.53; 123/435; 123/491; 123/685; 123/179.5; 123/179.16
[58] Field of Search ........................ 123/491, 435, 123/179.5, 179.16, 406.42, 406.53, 685, 686, 486

[56] References Cited

U.S. PATENT DOCUMENTS

| | | | |
|---|---|---|---|
| 4,391,248 | 7/1983 | Latsch | 123/435 |
| 4,417,556 | 11/1983 | Latsch | 123/435 |
| 4,706,628 | 11/1987 | Trombley | 123/435 |
| 4,721,089 | 1/1988 | Currie et al. | 123/435 |
| 4,727,842 | 3/1988 | Takahashi | 123/425 |
| 4,736,724 | 4/1988 | Hamburg et al. | 123/435 |
| 5,027,773 | 7/1991 | Shimomura et al. | 123/435 |
| 5,067,463 | 11/1991 | Remboski et al. | 123/406.28 |
| 5,284,114 | 2/1994 | Fukui | 123/435 |
| 5,483,946 | 1/1996 | Hamburg et al. | 123/686 |
| 5,676,113 | 10/1997 | Johansson et al. | 123/406.26 |
| 5,778,857 | 7/1998 | Nakamura | 123/406.41 |

*Primary Examiner*—Erick R. Solis
*Attorney, Agent, or Firm*—Allan J. Lippa; Roger L. May

[57] ABSTRACT

A method and system for controlling air/fuel ratio of an internal combustion engine during cold start operation utilizes control logic to determine a base fuel pulsewidth and a base spark timing according to corresponding cold-start look-up tables. A crank angle of the engine at which a peak pressure in the cylinder occurs is then sensed to obtain a crank angle at peak pressure (PPCA) value. Upon reaching stable combustion, the base fuel pulsewidth and the base spark timing are ramped to a predetermined desired fuel pulsewidth and a predetermined desired spark timing based on the PPCA value so as to control the air/fuel ratio. Upon reaching this state, combustion stability is maintained by feedback control of fuel pulsewidth and spark timing based on the statistical variation of successive PPCA values.

20 Claims, 4 Drawing Sheets

METHOD AND SYSTEM FOR CONTROLLING AIR/FUEL RATIO OF AN INTERNAL COMBUSTION ENGINE DURING COLD START

TECHNICAL FIELD

This invention relates to methods and systems for controlling air/fuel ratio of internal combustion engines during cold start.

BACKGROUND ART

During the first 10–40 seconds of cold start engine operation, an internal combustion engine is typically commanded to operate at lean air/fuel ratio (A/F) with significantly retarded spark timing due to stringent emission regulations. This mode of engine operation, however, poses significant challenges especially in light of variability in product componentry and the in-use fuel driveability index. A key reason for this sensitivity is that during such cold start conditions, neither the exhaust gas oxygen (EGO) sensor nor the catalyst is active so the engine operation needs to be controlled under total open loop condition. At the same time, operating at lean A/F with significant spark retard causes the combustion to become significantly more unstable, resulting in large torque fluctuations which create various forms of undesirable noise, vibration and harshness (NVH).

Thus, there exists a need to operate the engine at lean A/F during engine cold start under a closed loop condition in order to insure combustion remains stable.

DISCLOSURE OF THE INVENTION

It is thus a general object of the present invention to provide a method and system for controlling air/fuel ratio during engine cold start.

In carrying out the above object and other objects, features, and advantages of the present invention, a method is provided for controlling air/fuel ratio of an internal combustion engine during cold start operation. The engine includes a cylinder for receiving fuel and air which itself includes a spark plug for initiating combustion of the fuel and air therein according to a timing of the spark plug firing. The method includes determining a base fuel pulsewidth and a base spark timing for each cylinder firing. The method also includes sensing a crank angle of the engine at which a peak pressure occurs in the cylinder to obtain a crank angle at peak pressure (PPCA) value, and sensing a first predetermined event. Finally, the method includes ramping one of the base fuel pulsewidth and the base spark timing to a predetermined desired fuel pulsewidth and a predetermined desired spark timing, respectively, based on the PPCA value upon sensing the first predetermined event so as to control the air/fuel ratio.

In further carrying out the above object and other objects, features, and advantages of the present invention, a system is also provided for carrying out the steps of the above described method. The system includes control logic operative to determine a base fuel pulsewidth and a base spark timing for each cylinder firing. Still further, the system includes means for sensing a crank angle of the engine at which a peak pressure in the cylinder occurs to obtain a crank angle at peak pressure (PPCA) value. The control logic is further operative to sense a first predetermined event, and ramp one of the base fuel pulsewidth and the base spark timing to a predetermined desired fuel pulsewidth and a predetermined desired spark timing, respectively, based on the PPCA value upon sensing the first predetermined event so as to control the air/fuel ratio.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
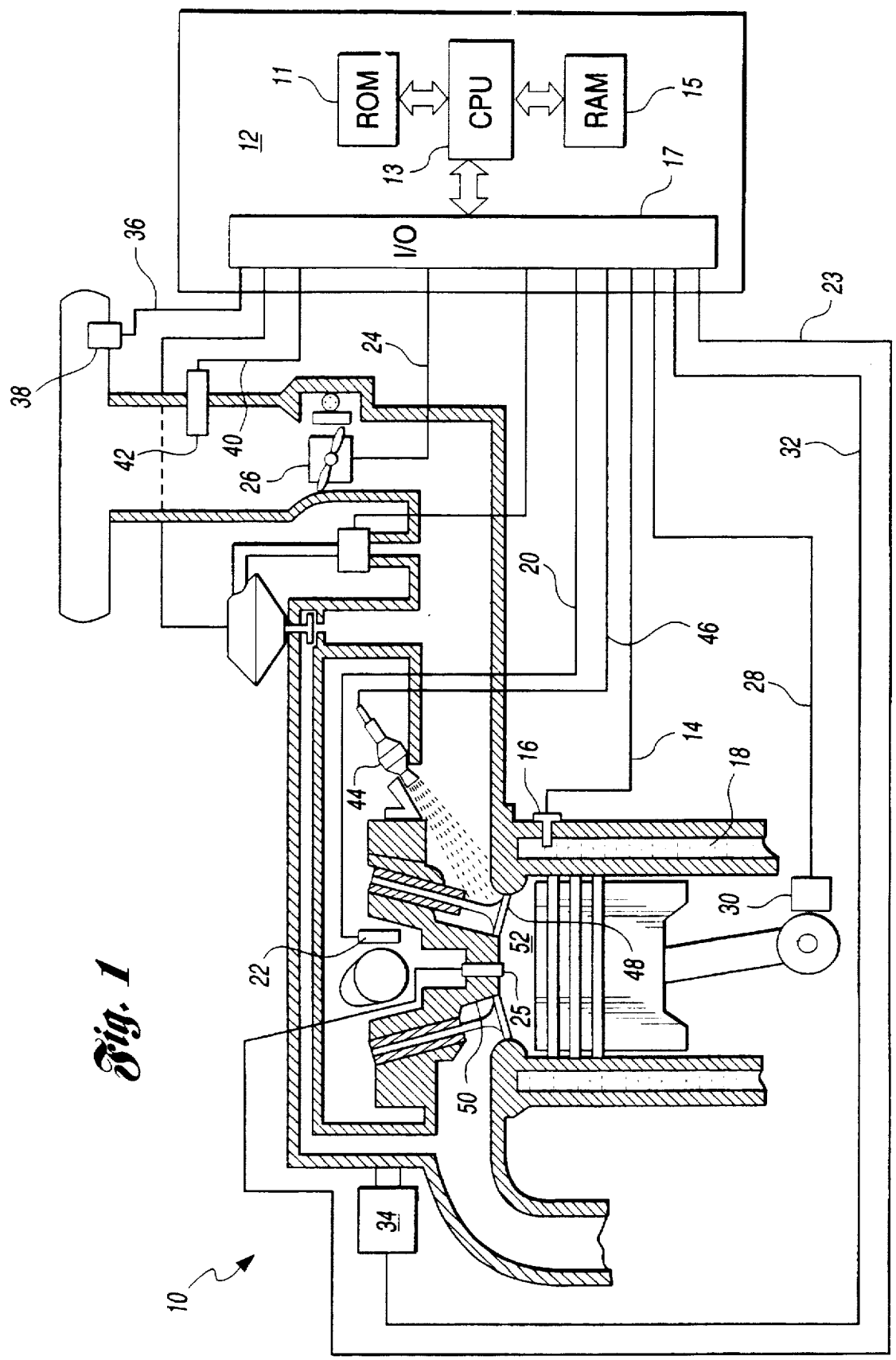
FIG. 1 is a schematic diagram of an internal combustion engine and an electronic engine controller which embody the principles of the present invention.

Turning now to FIG. 1, there is shown an internal combustion engine which incorporates the teachings of the present invention. The internal combustion engine 10 comprises a plurality of combustion chambers, or cylinders, one of which is shown in FIG. 1. The engine 10 is controlled by an Electronic Control Unit (ECU) 12 having a Read Only Memory (ROM) 11, a Central Processing Unit (CPU) 13, and a Random Access Memory (RAM) 15. The ECU 12 receives a plurality of signals from the engine 10 via an Input/Output (I/O) port 17, including, but not limited to, an Engine Coolant Temperature (ECT) signal 14 from an engine coolant temperature sensor 16 which is exposed to engine coolant circulating through coolant sleeve 18, a Cylinder Identification (CID) signal 20 from a CID sensor 22, a cylinder pressure signal 23 from an in-cylinder pressure sensor (IPS) 25, a throttle position signal 24 generated by a throttle position sensor 26 indicating the position of a throttle plate (not shown) operated by a driver, a Profile Ignition Pickup (PIP) signal 28 generated by a PIP sensor 30, a Heated Exhaust Gas Oxygen (HEGO) signal 32 from a HEGO sensor 34, an air intake temperature signal 36 from an air temperature sensor 38, an intake manifold temperature signal 40 and an intake manifold pressure signal 42 from manifold absolute pressure (MAP) sensor 43.

The ECU 12 processes these signals and generates corresponding signals, such as a fuel injector pulse waveform signal transmitted to the fuel injector 44 on signal line 46 to control the amount of fuel delivered by the fuel injector 44. ECU 12 also generates a combustion initiation signal (not shown) for receipt by a spark plug (not shown, but positioned in same opening as IPS 25) to initiate combustion of the air and fuel in the cylinder.

Intake valve 48 operates to open and close intake port 50 to control the entry of the air/fuel mixture into combustion chamber 52.

Figure 2:
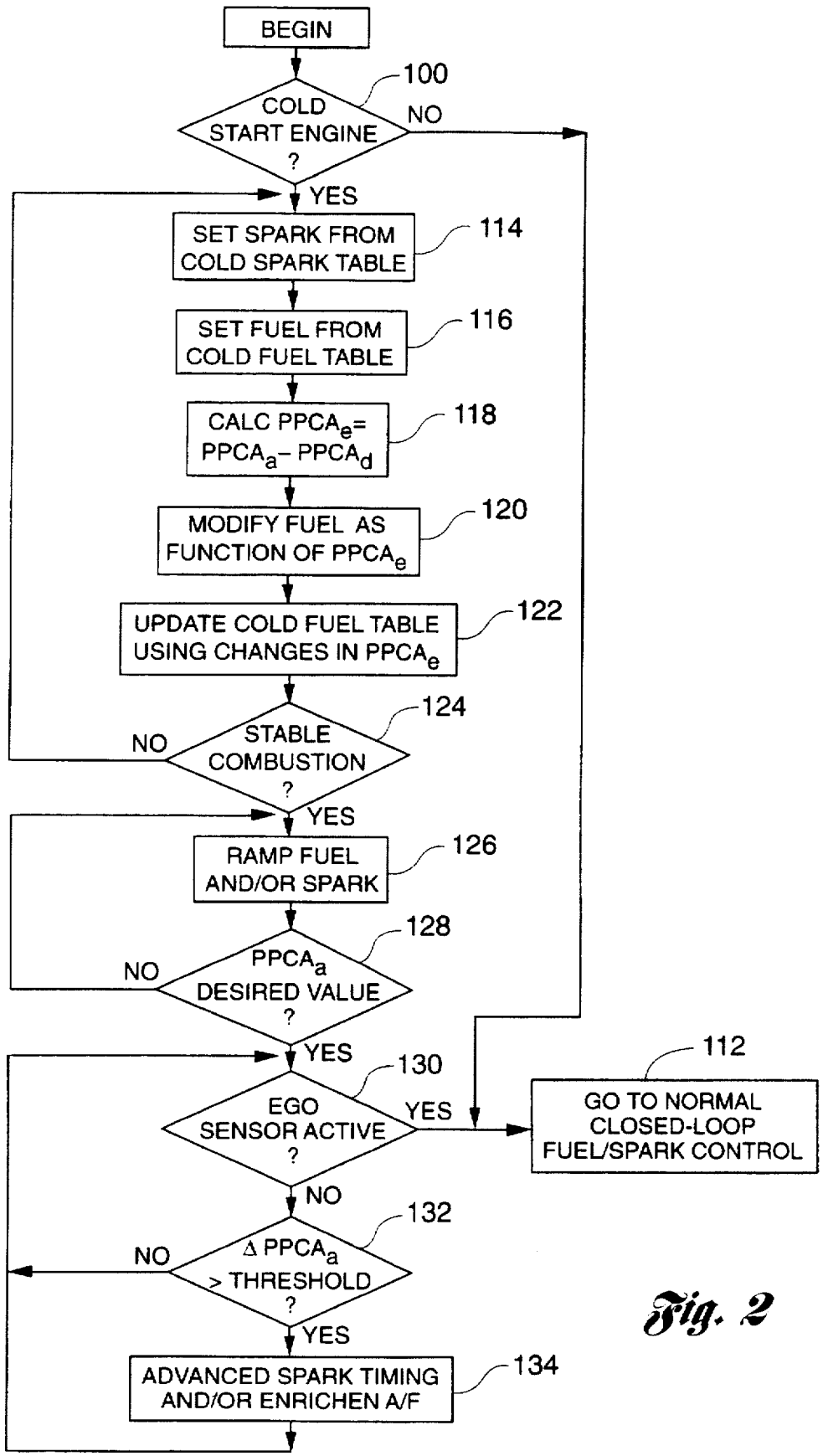
FIG. 2 is a flow diagram illustrating the general sequence of steps associated with the operation of the present invention.

Turning now to FIG. 2, there is shown a flow diagram illustrating the general sequence of steps associated with the method of the present invention. Although the steps shown in FIG. 2 are depicted sequentially, they can be implemented utilizing interrupt-driven programming strategies, objectoriented programming, or the like. It is assumed that the computational power of the ECU 12 permits all sensing, calculation and command generation to be accomplished for each cylinder individually from one firing to the next. In a preferred embodiment, the steps shown in FIG. 2 comprise a portion of a larger routine which performs other engine control functions.

The method begins with the step of determining whether or not the engine 10 is operating at cold start, as shown at conditional block 100. As mentioned above, cold start operation occurs during the first 10–40 seconds after cranking when the EGO sensor 34 and the catalyst (not shown) are not yet operational. If the engine 10 is not in cold start operation, the method proceeds to normal closed loop control for air/fuel ratio (A/F) and spark timing, as shown at block 112. This closed loop control may comprise any of the generally known methods for controlling A/F during non-cold start engine operation.

If the engine 10 is operating at cold start, the method proceeds to a first time period, Phase I, which corresponds to approximately 1–2 seconds of cylinder firings until the engine speeds up to a predetermined operational engine speed, typically 800 rpm to 1200 rpm. First, a base spark timing and fuel pulsewidth are determined from cold start look-up tables, as shown at blocks 114, 116, respectively.

Figure 3:
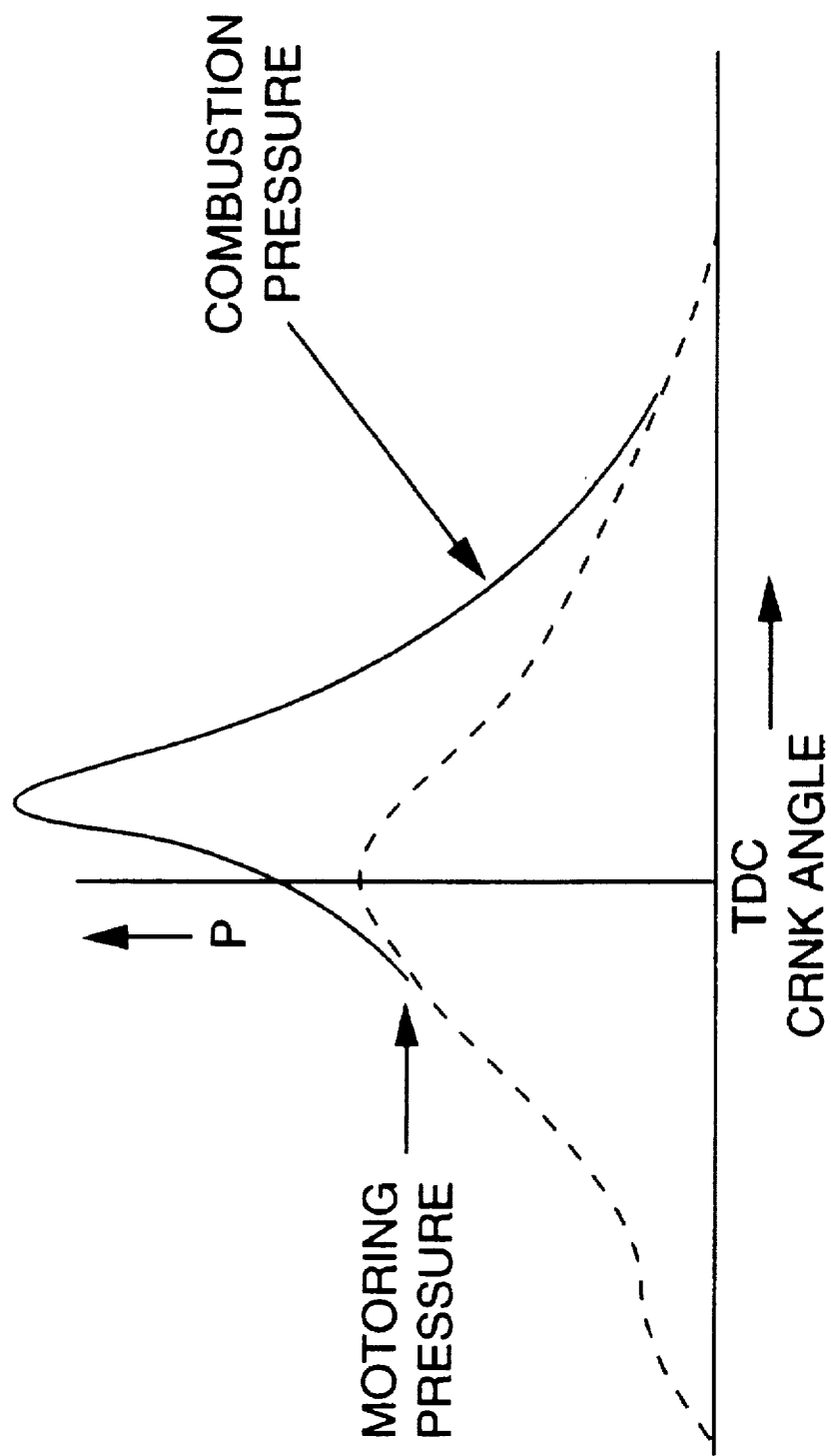
FIG. 3 is a graph illustrating typical combustion pressure versus crank angle of the present invention.

The base fuel injection amount is then adjusted via a closed loop error correction scheme to achieve near optimum combustion. The closed loop error scheme is based on an error signal corresponding to the difference between a Crank Angle at Peak Pressure actual and a Crank Angle at Peak Pressure desired, or $PPCA_e = PPCA_a - PPCA_d$, as shown at block 118. To obtain $PPCA_a$, the pressure in the cylinder is sensed via IPS 25 while also sensing the crank angle of the engine 10 via PIP sensor 30. The crank angle at which the peak value of the in-cylinder pressure occurred is determined according to: [(crank angle equivalent of PIP period)× (time to pressure peak from PIP edge)/(PIP period)]–an offset. A graph illustrating combustion pressure versus crank angle during Phase I is shown in FIG. 3.

Figure 4:
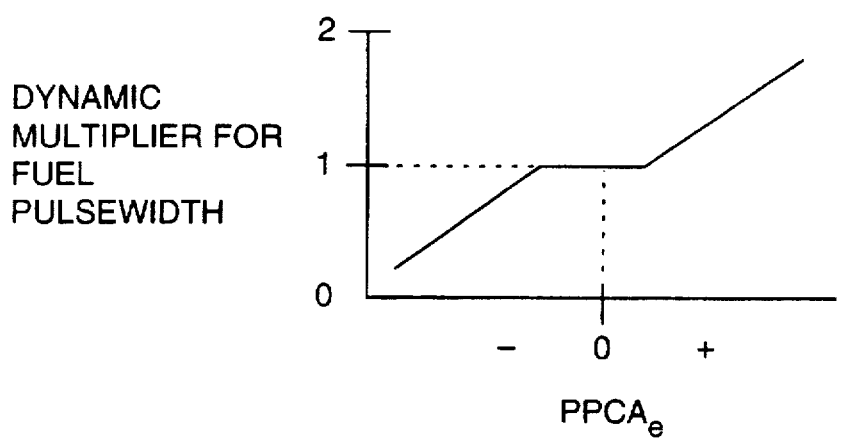
FIG. 4 is graph illustrating how the closed loop dynamic multiplier for fuel pulsewidth is calculated during Phase I of the present invention.

The base fuel pulsewidth is then modified based on the error signal, as shown at block 120. That is, the fuel pulsewidth is modified by multiplying the base fuel pulsewidth (or beginning fuel pulsewidth obtained from the cold start table) by a dynamic multiplier if the error signal is less than a predetermined minimum threshold or greater than a predetermined maximum threshold, as shown in FIG. 4. This predetermined window is determined experimentally based on the statistics associated with normal operation at specific speed-load points corresponding to the crank/run-up mode of operation, e.g., ±5 degrees. If the error signal is less than the predetermined minimum threshold, fuel is subtracted from the base fuel pulsewidth. In contrast, if the error signal exceeds the predetermined maximum threshold, fuel is added to the base fuel pulsewidth.

This closed loop operation can be enhanced to achieve faster convergence by developing an adaptive adjustment of the fuel injection pulsewidth with respect to the error signal based on the previous Phase I engine operating experience. That is, for each Phase I operation, the average value of the dynamic multiplier is tracked on an engine cylinder-by-cylinder basis. This value is then used on the next Phase I crank as a (base) adaptive multiplier by updating the fuel pulsewidth stored in the cold start tables, as shown at block 122.

This process continues until a first predetermined event, i.e., stable combustion, is achieved, as shown at conditional block 124. Stable combustion occurs when the engine has reached its operational engine speed with the peak in-cylinder pressure occurring within the desired window, as discussed above. At this time, a second time period, Phase II, begins, and the base spark timing and modified fuel pulsewidth are ramped toward a target retarded spark value and a desired lean A/F value, respectively, as shown at block 126. The target values are based on a predefined correlation among spark timing, lean A/F, and desired crank angle at peak pressure, typically measured on dynamometer-mounted engines.

This ramping, however, is controlled by tracking the shift in the crank angle value at which combustion generated peak pressure occurs during predetermined time periods. That is, the crank angle at which peak pressure occurs has a predetermined desired trajectory for optimum combustion. Therefore, for each given time period from the beginning of this phase to the end of this phase, the ramping of the fuel and/or spark is monitored to make sure the actions do not cause the PPCA to deviate from its desired trajectory. This phase ends when the spark retard and A/F leaning actions reach the desired crank angle location of the peak combustion-generated pressure, as shown at conditional block 128.

The method proceeds to a third time period, Phase III, which consists of maintaining operation at the desired spark retard and lean A/F level without unacceptable combustion instability until the EGO sensor 34 becomes active and allows a more direct feedback control of the A/F, as shown at conditional block 130.

Figure 5:
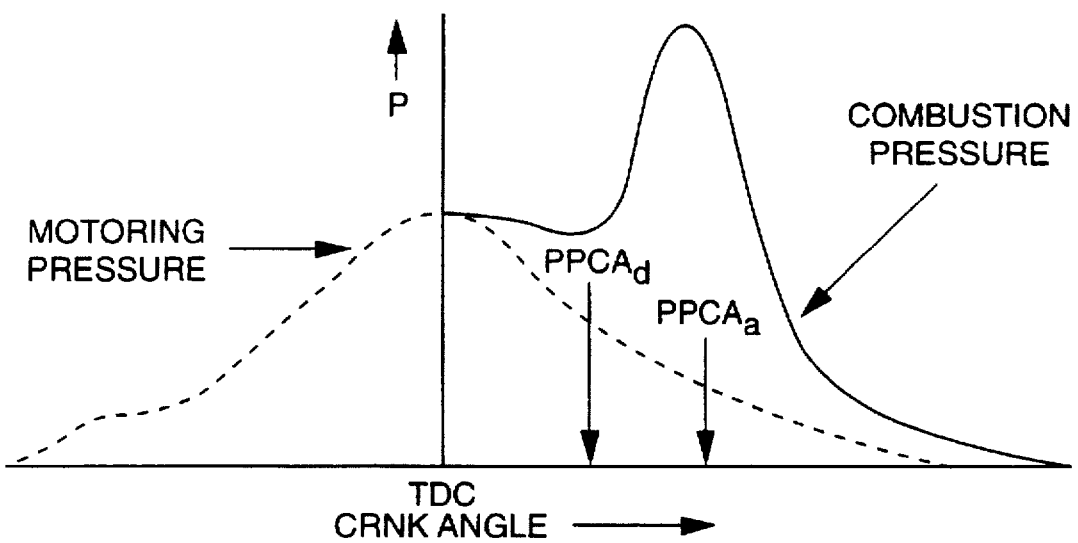
FIG. 5 is a graph illustrating a desired combustion pressure versus crank angle.

By observing the movement in the value of the crank angle at which the combustion-generated peak cylinder pressure occurs, combustion stability can be controlled. This is accomplished, for example, by tracking the value of a moving average of the differences in successive PPCAA values for each cylinder. If the differences in successive PPCAa values exceed an instability threshold, as shown at conditional block 132, spark timing is advanced (i.e., decrease spark retard) and/or A/F is enrichened, as shown at block 134. This process is repeated until the variation is reduced below the instability threshold. Under this operating condition, the crank angle value at which peak in-cylinder pressure occurs is significantly shifted from the normal operation described above, as shown in FIG. 5.

While the best modes for carrying out the invention have been described in detail, those familiar with the art to which this invention relates will recognize various alternative designs and embodiments for practicing the invention as defined by the following claims.

What is claimed is:

1. A method for controlling air/fuel ratio of an internal combustion engine during cold start operation, the engine including a cylinder for receiving fuel and air and having a spark plug for initiating the combustion of the fuel and air therein according to a timing of the spark plug firing, the method comprising:

(a) determining a base fuel pulsewidth and a base spark timing according to corresponding cold-start look-up tables;

(b) sensing a crank angle of the engine at which a peak pressure in the cylinder occurs to obtain a crank angle at peak pressure (PPCA) value;

(c) sensing a first predetermined event; and (d) ramping one of the base fuel pulsewidth and the base spark timing to a predetermined desired fuel pulsewidth and a predetermined desired spark timing, respectively, based on the PPCA value upon sensing the first predetermined event so as to control the air/fuel ratio to insure stable combustion at the current operating point of the engine.

2. The method as recited in claim 1 wherein ramping further comprises:

sensing a second predetermined event;

sensing successive PPCA values upon sensing the second predetermined event to obtain a statistical average;

comparing the statistical average with a predetermined statistical metric; and modifying at least one of the predetermined desired fuel pulsewidth and the predetermined desired spark timing if the statistical average exceeds the predetermined statistical metric so as to control combustion instability.

3. The method as recited in claim 1 further comprising modifying the base fuel pulsewidth prior to ramping the base fuel pulsewidth and wherein modifying the base fuel pulsewidth includes:

(e) comparing the sensed PPCA value with a first desired PPCA value to obtain a difference; and (f) determining a dynamic multiplier based on the difference.

4. The method as recited in claim 3 wherein the dynamic multiplier is greater than one if the difference exceeds a predetermined maximum threshold.

5. The method as recited in claim 3 wherein the dynamic multiplier is less than one if the difference is less than a predetermined minimum threshold.

6. The method as recited in claim 3 further comprising:

repeating steps (b) and (e)–(f) to obtain a plurality of dynamic multipliers;

determining an average value of the dynamic multipliers; and wherein determining the base fuel pulsewidth further includes determining the base fuel pulsewidth based on the average value of the dynamic multipliers.

7. The method as recited in claim 1 wherein sensing the first predetermined event comprises:

sensing a speed of the engine; and comparing the speed with a predetermined engine speed threshold.

8. The method as recited in claim 1 wherein the PPCA value has a predetermined trajectory and wherein ramping includes comparing the sensed PPCA value with its predetermined trajectory during predetermined time periods.

9. The method as recited in claim 2 wherein sensing the second predetermined event includes determining if the sensed PPCA value equals a second desired PPCA value.

10. The method as recited in claim 2 wherein modifying the at least one of the predetermined desired fuel pulsewidth and the predetermined desired spark timing includes performing one of advancing and retarding the desired spark timing.

11. The method as recited in claim 2 wherein modifying at least one of the predetermined desired fuel pulsewidth and the predetermined desired spark timing includes performing one of increasing and decreasing the desired fuel pulsewidth.

12. A system for controlling air/fuel ratio of an internal combustion engine during cold start operation, the engine including a cylinder for receiving fuel and air and having a spark plug for initiating the combustion of the fuel and air therein according to a timing of the spark plug, the system comprising:

control logic operative to determine a base fuel pulsewidth and a base spark timing according to corresponding cold-start look-up tables;

means for sensing a crank angle of the engine at which a peak pressure in the cylinder occurs to obtain a crank angle at peak pressure (PPCA) value; and the control logic further operative to sense a first predetermined event, and ramp one of the base fuel pulsewidth and the base spark timing to a predetermined desired fuel pulsewidth and a predetermined desired spark timing, respectively, based on the PPCA value upon sensing the first predetermined event so as to control the air/fuel ratio to insure stable combustion at the current operating point of the engine.

13. The system as recited in claim 12 wherein the control logic, in ramping, is further operative to sense a second predetermined event, sense successive PPCA values upon sensing the second predetermined event to obtain a statistical average, compare the statistical average with a predetermined statistical metric, and modify at least one of the predetermined desired fuel pulsewidth and the predetermined desired spark timing if the statistical average exceeds the predetermined statistical metric so as to control combustion instability.

14. The system as recited in claim 12 wherein the control logic is operative to modify the base fuel pulsewidth prior to ramping the base fuel pulsewidth, and in modifying the base fuel pulsewidth, the control logic is further operative to compare the sensed PPCA value with a first desired PPCA value to obtain a difference, and determine a dynamic multiplier based on the difference.

15. The system as recited in claim 14 wherein the dynamic multiplier is greater than one if the difference exceeds a predetermined maximum threshold.

16. The system as recited in claim 14 wherein the dynamic multiplier is less than one if the difference is less than a predetermined minimum threshold.

17. The system as recited in claim 12 further comprising:

a speed sensor for sensing a speed of the engine; and the control logic, in sensing the first predetermined event comprises, is further operative to compare the speed with a predetermined engine speed threshold.

18. The system as recited in claim 12 wherein the PPCA value has a predetermined trajectory and wherein the control logic, in ramping, is further operative to compare the sensed PPCA value with its predetermined trajectory during predetermined time periods.

19. The system as recited in claim 13 wherein the control logic, in sensing the second predetermined event, is further operative to determine if the sensed PPCA value equals a second desired PPCA value.

20. An article of manufacture for an automotive vehicle having an internal combustion engine having a cylinder for receiving fuel and air and the cylinder including a spark plug for initiating the combustion of the fuel and air therein according to a timing of the spark plug firing, the vehicle further having means for sensing the engine being in a crank state, and means for sensing a crank angle of the engine at which a peak pressure in the cylinder occurs to obtain a crank angle at peak pressure (PPCA) value, the article of manufacture comprising:

a computer storage medium having a computer program encoded therein for determining a base fuel pulsewidth and a base spark timing according to corresponding cold-start look-up tables, sensing a first predetermined event, and ramping one of the base fuel pulsewidth and the base spark timing to a predetermined desired fuel pulsewidth and a predetermined desired spark timing, respectively, based on the PPCA value upon sensing the first predetermined event so as to control the air/fuel ratio.

\* \* \* \* \*